United States Patent [19]

Nien

[11] Patent Number: 5,201,355
[45] Date of Patent: Apr. 13, 1993

[54] BIOLOGICALLY RESOLVABLE BLIND SLAT AND MANUFACTURING METHOD THEREFOR

[75] Inventor: Ming Nien, Changhua Hsien, Taiwan

[73] Assignee: Nien Made Enterprise Co., Ltd., Changhua Hsien, Taiwan

[21] Appl. No.: 844,545

[22] Filed: Mar. 2, 1992

[51] Int. Cl.⁵ .............................................. E06B 3/00
[52] U.S. Cl. ................................. 160/236; 264/115; 264/118; 264/126; 524/47
[58] Field of Search .............. 264/118, 115, 140, 138, 264/126; 160/236; 524/47

[56] References Cited

U.S. PATENT DOCUMENTS

| 2,620,869 | 12/1952 | Friedman | 160/236 |
| 4,889,673 | 12/1989 | Takimoto | 264/118 |
| 5,087,650 | 2/1992 | Willett | 524/47 |
| 5,102,598 | 4/1992 | Chen | 264/140 |
| 5,115,000 | 5/1992 | Jane et al. | 524/47 |

FOREIGN PATENT DOCUMENTS

| 0282368 | 9/1988 | European Pat. Off. | 524/47 |
| 2214918 | 9/1989 | United Kingdom | 524/47 |

Primary Examiner—Mary Lynn Theisen
Attorney, Agent, or Firm—Bacon & Thomas

[57] ABSTRACT

A biologically resolvable blind slat and the manufacturing method therefor, wherein PVC powders serve as a basic material and are added with stabilizer, lubricant, calcium carbonate and surface-treated starch to mix therewith, the mixture being processed by a granulating machine into granules which are further heated and pressed by a press machine into strips, the strips being then cut into blind slats in a certain pattern and at a certain length.

4 Claims, No Drawings

BIOLOGICALLY RESOLVABLE BLIND SLAT AND MANUFACTURING METHOD THEREFOR

BACKGROUND OF THE INVENTION

The present invention relates to a biologically resolvable blind slat and the manufacturing method therfor, wherein PVC powders serve as a basic material and are added with stabilizer, lubricant, calcium carbonate and surface-treated starch to mix therewith, the mixture being processed by a granulating machine into granules which are further heated and pressed by a press machine into strips and the strips are then cut into blind slat in a certain pattern and at a certain length. Such blind slat is biologically resolvable and can be made with a colorful drawing on the surface thereof to improve the appearance thereof.

Convention blind slats are mainly made of plastics or made of wood or metal. The light-shielding effects thereof are substantially the same. The wooden blind slat after discarded can be burned off to avoid causing environment pollution. However, the wooden slat is made at high cost and the manufacture thereof is relatively difficult. Moreover, such slat is apt to fissure after a long term of exposing to sunlight. Therefore, such slat is not durable. As to the metal slat, after discarded, the metal slat can be recovered to avoid causing environment pollution. However, the cost thereof is high and surface-processing thereof is difficult. Also, metal slat is apt to be bent and distorted while unable to restore to its original shape. Plastic slat is made at low cost and easily manufactured and such slat is durable. However, plastic slat after discarded will not be naturally resolved so as to cause environmental contamination. If such slat is processed by burning, air pollution will inevitably take place. Moreover, the above three types of blind slats after manufactured, are difficult to be made with any colorful drawings thereon so that these slats can only shield the sunlight while failing to produce decorative effect.

Therefore, a blind slat which can be easily manufactured at low cost and which can be naturally resolved after discarded to avoid causing environment pollution and which can be freely made with desired colorful drawings thereon is needed.

SUMMARY OF THE INVENTION

It is a primary object of this invention to provide a biologically resolvable blind slat which possesses the advantages of a plastic blind slat while able to eliminate the problem of environment pollution. Moreover, such blind slat can be made with colorful drawings thereon by the user to improve the decorative effect.

According to the above object, the present blind slat is made in such a manner that surface-treated starch and stabilizer, lubricant and calcium carbonate are added to and evenly mixed with PVC powder which serves as a basic material and then the mixture is processed by a granulating machine into granules.

Color powder can be directly added to the mixture to form a desired color of blind slat.

The above biologically resolvable blind slat is manufactured in such a manner that the surface-treated starch, PVC powder, stabilizer, lubricant and calcium carbonate are mixed evenly and then the mixture is processed by a granulating machine into granules which are further heated and pressed by a press machine into strips. The strips are then cut into the blind slats in a desired pattern and at a desired length.

DETAILED DESCRIPTION OF THE PREFERRED EMBODIMENT

The blind slat of this invention is manufactured in such a manner that stabilizer and calcium carbonate are added to PVC granules and surface-treated starch and mixed therewith, and then the mixture is heated and processed by a granulating machine into granules which are further heated and pressed by a press machine into strips and then the strips are cut in a certain pattern and at a certain length into the slats.

The mixture is formed at such a composition ratio that 95 kilogram PVC powder, 4 kilogram stabilizer, 1 kilogram lubricant, 45 kilogram calcium carbonate and 10 kilogram starch are evenly mixed.

The slat formed by the above compositions due to PVC property possesses corrosion-resistance, appropriate rigidity and collision-resistance and will not suffer efflorescence and thus can be durably used. In addition, due to the added surface-treated starch, the blind slat is formed with fine holes on its surface and thus like a paper, can be made with a colorful drawing thereon while still keeping the regidity and collision-resistance. Particularly, general starch will be burned black at about 96° C. while the surface-treated starch used in this invention can stand high temperature up to 250° C. Moreover, such starch can cooperate with the stabilizer, calcium carbonate and lubricant to evenly mix with the PVC so that the PVC particles can closely combine with the starch molecules to maintain the original rigidity and collision-resistance of the PVC and starch materials while further having the heat-resistance. Moreover, when the slat is buried in the ground, the starch will be resolved biologically and totally disappear from the ground after one and half years to two years. Therefore, the environmental contamination is eliminated.

When manufacturing the above blind slat, the color powder can be directly added into the compositions to form a desired color of blind slat.

The biologically resolvable blind slat is manufactured in such a manner that the aforesaid compositions is heated by a press machine at about 230° C. and then the heated material is pressed into strips with equal width which is then cut in a certain pattern and at a certain length into the blind slat. The blind slat made in such manner has a smooth surface formed with fine holes like a paper surface while possessing rigidity, heat-resistance and collision-resistance of a plastic slat. Particularly, the starch contained therein will be resolved biologically so as to prevent environment pollution.

What is claimed is:

1. A biologically resolvable blind slat which is manufactured in such a manner that stabilizer and calcium carbonate are added to PVC powder and surface-treated starch to mix therewith and then the mixture is heated and processed by a granulating machine into granules and said granules are heated and pressed to form slats.

2. A blind slat as claimed in claim 1, wherein the mixing ratio of each composition is such that 75 kilogram PVC powder, 4 kilogram stabilizer, 1 kilogram lubricant, 45 kilogram calcium carbonate and 10 kilogram starch are evenly mixed.

3. A blind slat as claimed in claim 1, wherein colors can be directly added to said mixture to form a desired color of blind slat.

4. A manufacturing method for biologically resolvable blind slat, wherein stabilizer and calcium carbonate are added to PVC powder and surface-treated starch to mix therewith, and the mixture is then heated and processed by a granulating machine into granules which are heated and pressed by a press machine into strips and then the strips are cut into slats at a certain pattern and by a certain length.

* * * * *